United States Patent
Macaluso

(10) Patent No.: US 10,412,557 B2
(45) Date of Patent: *Sep. 10, 2019

(54) MOBILE MACHINE

(71) Applicant: Sito Mobile R&D IP, LLC, Jersey City, NJ (US)

(72) Inventor: Anthony G. Macaluso, Rancho Santa Fe, CA (US)

(73) Assignee: SITO Mobile R&D IP, LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,098

(22) Filed: Oct. 15, 2018

(65) Prior Publication Data

US 2019/0053017 A1  Feb. 14, 2019

Related U.S. Application Data

(63) Continuation of application No. 13/921,852, filed on Jun. 19, 2013, now Pat. No. 10,104,513, which is a
(Continued)

(51) Int. Cl.
*H04L 29/06* (2006.01)
*G10H 1/00* (2006.01)
*H04W 4/18* (2009.01)

(52) U.S. Cl.
CPC ............ *H04W 4/18* (2013.01); *G10H 1/0058* (2013.01); *H04L 63/10* (2013.01);
(Continued)

(58) Field of Classification Search
CPC .. H04L 63/10; H04L 29/06027; G10H 1/0058
See application file for complete search history.

(56) References Cited

U.S. PATENT DOCUMENTS 7,441,192 B2 * 10/2008 Pisz ..................... G11B 19/022
715/727
7,512,398 B2 * 3/2009 Chambers ............... G06F 21/64
379/127.02

(Continued)

*Primary Examiner* — Asghar H Bilgrami
(74) *Attorney, Agent, or Firm* — Polsinelli PC

(57) ABSTRACT

A system for providing mobile content to a mobile communication device includes a first computing system including one or more servers to provide, via a communications network, a graphical user interface at a second computing system, the graphical user interface (i) enabling the user of the second computing system to edit a digital file to create the mobile content and (ii) prompting and enabling a user of the second computing system to provide a phone number associated with the mobile communication device, the mobile communication device being separate and remote from the first computing system and the second computing system. The first computing system receives, from the second computing system via the communications network, the mobile content and the phone number associated with the mobile communication device. The first computing system uses a the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

20 Claims, 9 Drawing Sheets

Related U.S. Application Data continuation of application No. 11/752,503, filed on May 23, 2007, now Pat. No. 8,494,493.

(60) Provisional application No. 60/817,567, filed on Jun. 28, 2006.

(52) U.S. Cl.
CPC . *G10H 2230/021* (2013.01); *G10H 2240/026* (2013.01); *G10H 2240/251* (2013.01); *H04L 2463/101* (2013.01)

(56) References Cited

U.S. PATENT DOCUMENTS

| | | | |
|---|---|---|---|
| 2001/0027378 A1* | 10/2001 | Tennison | G01M 17/00 701/482 |
| 2005/0091683 A1* | 4/2005 | Sheynman | H04L 63/10 725/34 |
| 2005/0188027 A1* | 8/2005 | Clarke | H04W 68/00 709/206 |
| 2009/0264103 A1* | 10/2009 | Chen | H04L 29/06027 455/411 |
| 2010/0077486 A1* | 3/2010 | Qu | G06F 21/10 726/28 |
| 2010/0191955 A1* | 7/2010 | Jogand-Coulomb | G06F 21/10 713/150 |

* cited by examiner

MOBILE MACHINE

CLAIM OF PRIORITY

This application is a continuation of U.S. patent application Ser. No. 13/921,852, filed on Jun. 19, 2013, entitled Mobile Machine, which is a continuation of U.S. patent application Ser. No. 11/752,503, filed on May 23, 2007, entitled Mobile Machine (now U.S. Pat. No. 8,494,493 issued Jul. 23, 2013), which takes priority to U.S. Patent Application Ser. No. 60/817,567, filed on Jun. 28, 2006, the entire contents of which are incorporated herein by reference, all of which priority is claimed.

TECHNICAL FIELD

The subject matter described herein relates to the selection and creation of dynamic content and delivery of the created dynamic content to a mobile communication device.

BACKGROUND

Mobile communications devices, such as cellular telephones, are increasingly being utilized to provide content to users. However, users typically are not able to dynamically modify the content before receiving the content. Moreover, such information often is not optimized based on one or more operational parameters associated with the mobile communication device.

SUMMARY

Techniques for selecting and generating a dynamic digital data file to send to a mobile device are described.

In one aspect, a method for providing mobile content to a mobile communication device includes providing, by a first computing system including one or more servers via a communications network, a graphical user interface at a second computing system, the graphical user interface (i) enabling the user of the second computing system to edit a digital file to create the mobile content and (ii) prompting and enabling a user of the second computing system to provide a phone number associated with the mobile communication device, the mobile communication device being separate and remote from the first computing system and the second computing system. The method further includes receiving, by the first computing system from the second computing system via the communications network, the mobile content and the phone number associated with the mobile communication device. The method further includes using, by the first computing system, the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

In another aspect, a system for providing mobile content to a mobile communication device includes a first computing system including one or more servers to provide, via a communications network, a graphical user interface at a second computing system, the graphical user interface (i) enabling the user of the second computing system to edit a digital file to create the mobile content and (ii) prompting and enabling a user of the second computing system to provide a phone number associated with the mobile communication device, the mobile communication device being separate and remote from the first computing system and the second computing system. The first computing system receives, from the second computing system via the communications network, the mobile content and the phone number associated with the mobile communication device. The first computing system usea the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

In still another aspect, a computer program product is embodied on a non-transitory computer-readable storage medium and executable by a first computing system to perform operations comprising providing, by the first computing system via a communications network, a graphical user interface at a second computing system, the graphical user interface (i) enabling the user of the second computing system to edit a digital file to create mobile content and (ii) prompting and enabling a user of the second computing system to provide a phone number associated with a mobile communication device, the mobile communication device being separate and remote from the first computing system and the second computing system. The operations further include receiving, by the first computing system from the second computing system via the communications network, the mobile content and the phone number associated with the mobile communication device. The operations further include using, by the first computing system, the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

In another aspect, a desired digital data file is transferred to a target mobile communication device by allowing a user to dynamically generate mobile content based on the desired digital data file. A phone number associated with a mobile communication device is received from a user. A user selected digital data file is received and loaded onto an editor, and the received digital data file is verified for authorization to access the received file. When detected that the received digital data file is verified as an authorized file, the user is able to edit the verified digital data file to generate a mobile content. Also, a data connection is established with the mobile communication device associated with the received phone number. Based on the established data connection, one or more operational parameters of the mobile communication device is determined. Based on the determined operational parameters, the generated mobile content is transcoded into a format compatible with the determined operational parameters. The transcoded mobile content is delivered to the mobile communication device.

Implementations may optionally include one or more of the following features. Establishing the data communication can include sending a message to the mobile communication device. The message sent to the mobile communications device can include a pointer to information complementary to the desired content. When the pointer is activated at the mobile communications device, one or more operational parameters associated with the mobile communications device may be determined. Based on the determined operational parameters, data associated with the desired content is transmitted to the mobile communications device in a format compatible with the determined one or more operational parameters. Also, based on the received phone number, a wireless network carrier corresponding to the phone number is identified. When the wireless network carrier is identified, a user account associated with the phone number can be identified. The identified wireless network carrier and the user account can be used to verify a billing authorization for transferring a digital data file.

Implementations can also optionally include one or more of the following features. Verifying the authorization to access the received digital data file can include using a digital rights management technology to verify accessibility of the received digital data file. Verifying authorization to access the received digital data file using a digital rights management technology can include using message-digested algorithm 5 (MD5) hash function to determine whether the received digital file is an authorized file. Verifying authorization to access the received digital data file can further include comparing the received digital data file against a catalog of authorized digital data files stored in a database. Verifying authorization to access the received digital data file can include using a filter to deny access to a predetermined type of file. Loading a digital data file can be accomplished using a drag-and-drop operation. Alternatively, the desired digital data file can be found by using a Windows® Explorer type graphical user interface. Determining one or more operational parameters can include choosing from a group including a wireless data transport protocol, a hardware configuration of the mobile communication device, a software execution platform for the mobile communications device, and a software application resident on the mobile communications device.

Implementations can also optionally include one or more of the following features. The digital data file may include an audio file, an image file, and a video file, which can be used to create a ringtone, a wall paper image and a video clip respectively. Also, the mobile communication device can be polled to determine the one or more operational parameters. Alternatively, a communication header may be used to identify the one or more operational parameters.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification.

The subject matter described in this specification may provide one or more of the following advantages. For example, only the phone number associated with a target mobile communication device is needed from a user in order to deliver a desired content to the target mobile communication device. When a data connection is made with the mobile device, appropriate operational parameters of the target mobile communication device is determined. Therefore, the user is not required to have detailed knowledge of his/her mobile communication device.

Further features, aspects, and advantages will become apparent from the description, the drawings, and the claims.

BRIEF DESCRIPTION OF DRAWINGS

Like reference symbols in the various drawings indicate like elements.

DETAILED DESCRIPTION

The following describes techniques for transferring digital files to a mobile communication device. In particular, a desired digital file is loaded onto a media editor using drag-and-drop and edited to generate desired mobile content. A data connection is established with the mobile communication device to determine appropriate operational parameters of the mobile device. Based on the determined operational parameters, the generated content is transcoded into a format compatible with the mobile communication device. The transcoded content is transferred to the mobile communication device using a messaging technology such as short message service (SMS), multimedia message service (SMS), etc.

Figure 1A:
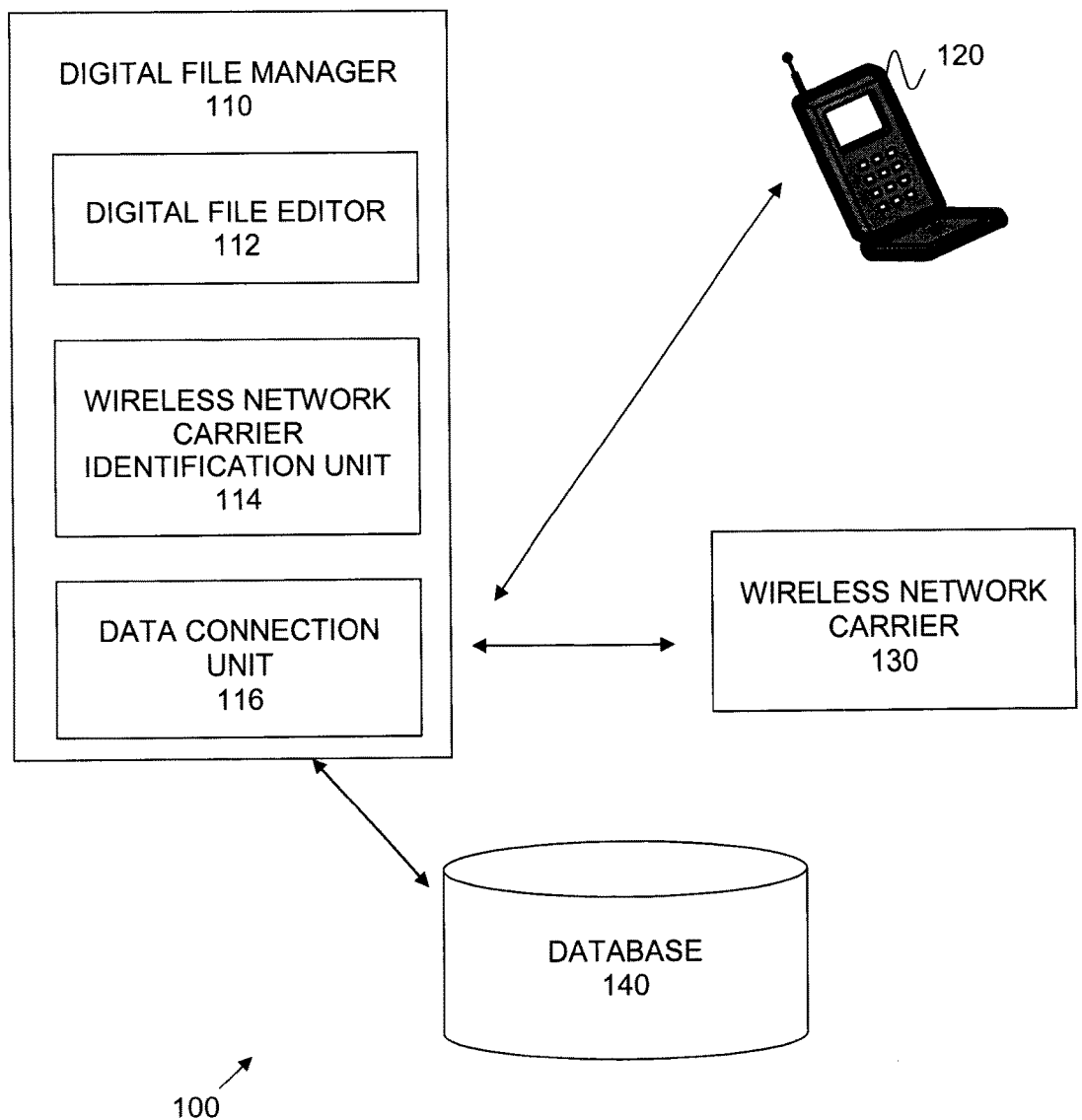
FIG. 1A is a block diagram of a system for transferring a digital data file to a mobile communication device.

FIG. 1A shows a system 100 for transferring a digital file (or a digital data file) to a mobile communication device. The system 100 comprises a digital file manager 110 in communication with a mobile communication device 120 and a wireless network carrier 130. The digital file manager 110 further comprises a digital file editor 112, a wireless network carrier identification unit 114, and a data connection unit 116. The digital file manager 110 may be implemented as an independent software executing on a computing device, such as a personal computer or other suitable devices. In some implementations, the digital file manager 110 may be implemented as an embedded Active X component located on a web page. For example, the digital file manager 110 may be implemented using a dynamic link library module (DLL). In some implementations, other suitable web based object oriented programming mechanisms (e.g., JAVA) can be implemented to be compatible with both Windows based platform and Apple Mac based platform. The system 100 can optionally include a database for maintaining a catalog of authorized digital data files (e.g., images, videos, audios, etc.)

Figure 1B:
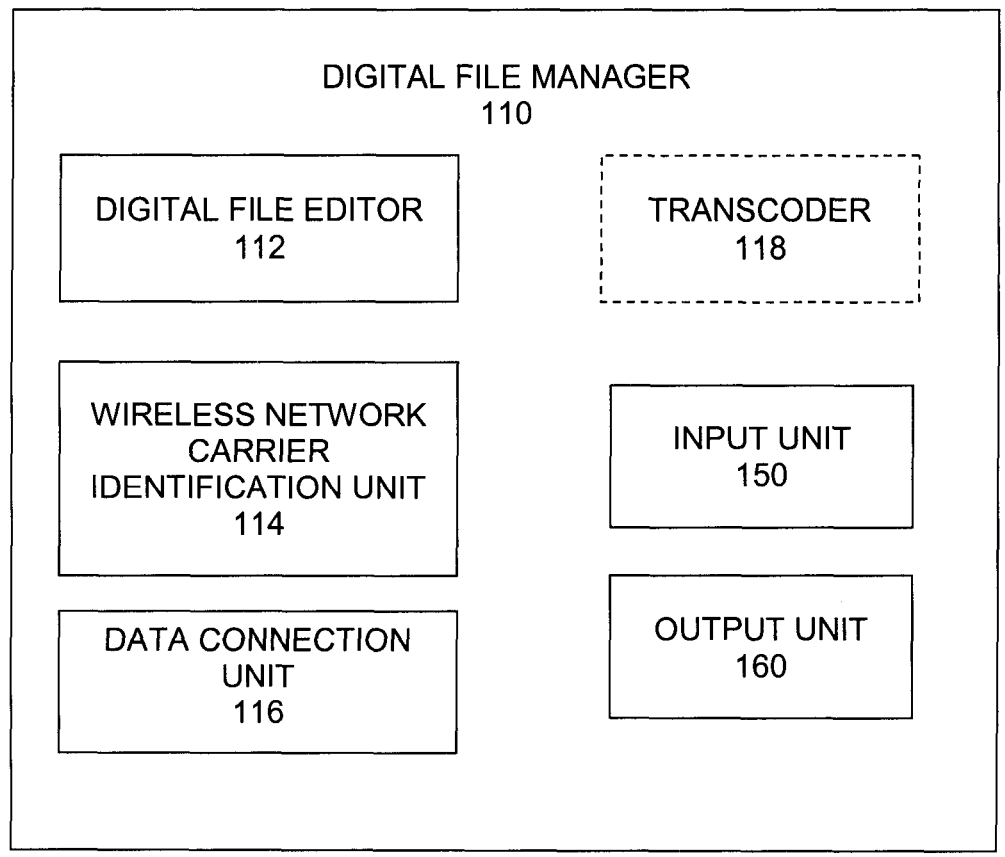
FIG. 1B is a block diagram of a digital file manager.

FIG. 1B illustrates additional components/features of the system 100. The digital file manager 110 also includes a input unit 150 and an output unit 160. The input unit 150 includes a mechanism for receiving input from a user or a computing system. For example, a graphical user interface (GUI) is implemented to receive input information necessary to transfer a desired digital data file to a target mobile communication device. The GUI is implemented to receive a telephone number associated with the target mobile communication device. Using the received telephone number, operational parameters of the target mobile communication device (e.g., type of mobile communication device, a wireless data transport protocol, a hardware configuration of the mobile communication device, a software execution platform for the mobile communications device, and a software application resident on the mobile communications device) is determined once the data connection unit 116 makes a data connection with the mobile communication device. Based on the determined operational parameters the desired content is transcoded into a format compatible with the target mobile device. Transcoding is a process of direct digital-to-digital conversion from one format to another. The data connection unit 116 is designed to either handle the transcoding process itself or communicate with a optional transcoder 118 to request completion of the transcoding process. In some implementations, the digital file editor performs the transcoding process. Thus, the functions performed by the digital file manager is not necessarily localized to individual units and can be performed by one or more of the components. Individually or jointly.

In addition, the GUI is implemented to receive a user selected digital data file to be edited, from which a mobile content is generated. The output unit 160 includes a mechanism for displaying information to the user. For example, a display area can be implemented to preview the user selected digital data file as the file is selected edited. This allows the user to see the final version of the created mobile content before the content is transferred to the target mobile communication device.

Figure 2:
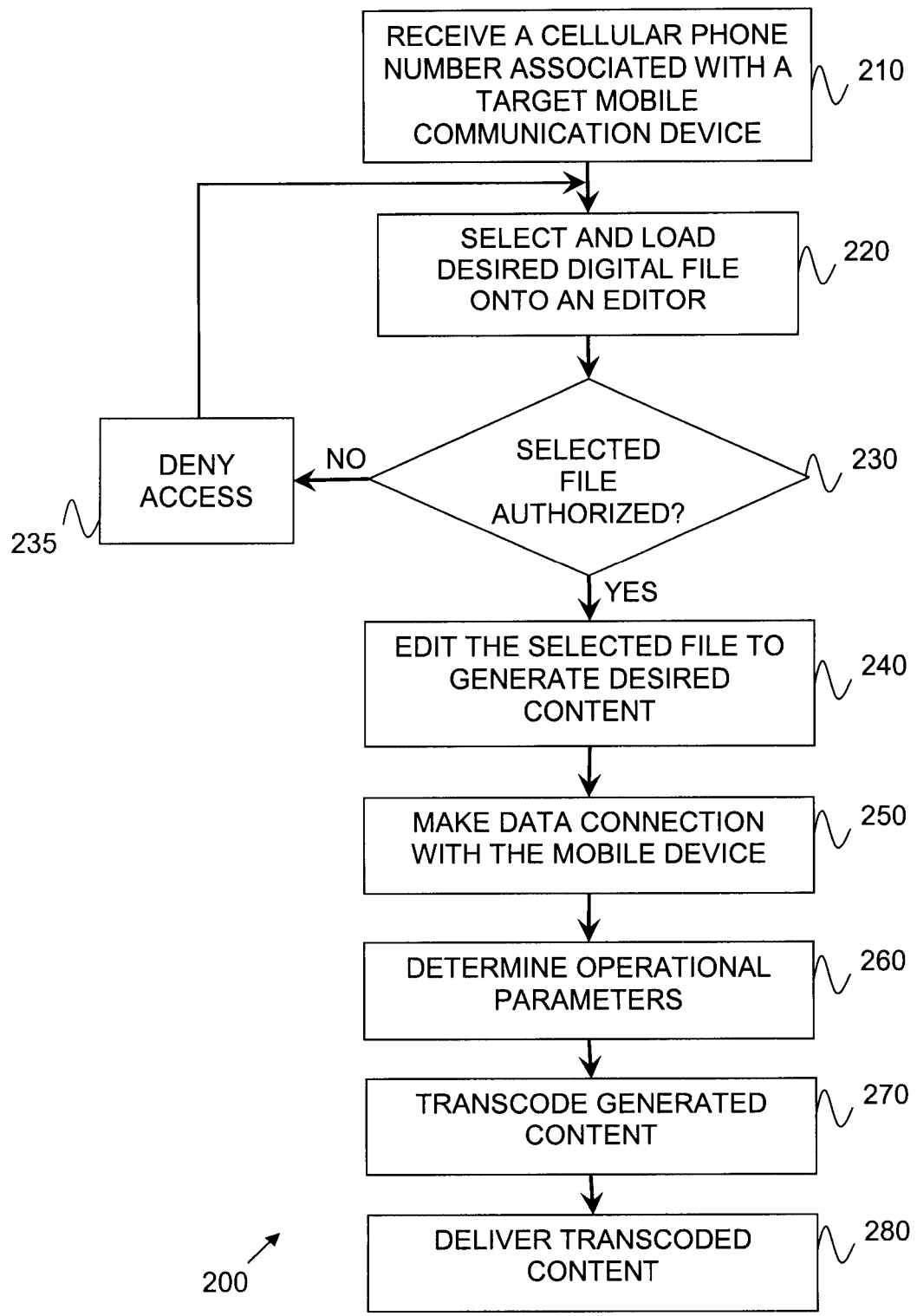
FIG. 2 is a flow chart of a process for transferring a digital data file to a mobile communication device.

FIG. 2 illustrates a process for transferring a digital file to a mobile communication device. A user enters a phone number associated with a mobile communication device (e.g., a cellular phone) at 210, and based on the phone number entered, a wireless network carrier associated with the phone number is identified. For example, the wireless network carrier includes Verizon Wireless, Cingular (AT&T), T-Mobile, Sprint, etc. Identifying the wireless network carrier allows a determination of the wireless user account associated with the phone number and verifies a payment method to effectuate data transfer through the wireless network. Depending on the wireless network carrier, the payment method may be either directly to the wireless network carrier or a separate payment processing mechanism.

At 220, a user selects a desired digital file and loads it onto the digital file editor 112 for processing the selected digital file before transferring the file to the mobile communication device 120. The digital file includes an audio file, an image file, a video file or any suitable data file desired to be transferred to the mobile communication device 120. While there is no limitation on the type of data file that may be transferred, the user may desire to select the digital file based on the capabilities of the mobile communication device to process the transferred digital file. For example, a smart phone (e.g., the Treo® by Palm®) may be designed to received Microsoft® Software based documents (e.g., Word®, Excel®, etc.), Adobe® Software based documents (e.g., Acrobat®), etc. Further, the digital file editor 112 is designed to recognize the various types of digital data files (e.g., an image file, an audio file, a video file, etc.) Thus, a single digital file editor is designed to receive, edit and transfer the various types of digital data files.

The selected digital file is verified for authorization to access the file at 230. This is performed using any one of various Digital Rights Management (DRM) technologies to prevent illegal access, duplication, transfer, etc. of protected digital files. Any one of the several well known DRM technologies can be implemented to enforce pre-defined policies for controlling access digital data such as music, images, videos, and software. One such DRM technology is Message-Digest algorithm 5 (MD5) hash function. MD5 is a cryptographic has function with a 128 bit has value. An MD5 has function is typically a 32-character hexadecimal number. For example, an MD5 hash function is used to maintain a database (e.g., 140) of authorized digital files (e.g. a catalog of authorized files), and when a user loads a digital file, the loaded digital file can be compared against the database to determine whether the loaded digital file is an authorized file. An authorized file can be a ringtone that has been properly licensed from the owner, for example. The DRM function is used to prevent transfer of pirated digital data and allow only those digital data legally purchased to be transferred.

In some implementations, verifying the authorization to access the selected digital file includes a filtering function. A filter can be used to deny access to a predetermined type of digital data file. For example, a pornographic or otherwise obscene image is recognized as not suitable for processing by the system 100. When a user selects an obscene file (image, video, audio, etc.), the digital file manage 110 accesses a catalog of authorized files stored in the database 140 to obtain a suitable alternative files. The recommended alternate files are displayed to the user.

In some implementations, a user is allowed to select user generated content. A user generated content, such as a photograph taken by the user is not part of the DRM system, and in order to allow such not authorized or not licensed files, a cap can be set to allow a predetermined maximum number of such files to be selected, loaded and transferred to the user's mobile device.

When the selected digital data file is detected to be an authorized file (or otherwise a user generated file within the predetermined cap), the user is allowed to edit the selected digital file using the digital file editor 112 to generate a desired mobile content at 240. When the selected digital data file is detected to be not authorized, the access to the selected digital data file is denied at 235. A message to that effect can to displayed to the user (e.g., "authorization to access the selected file has not been verified.") In addition, the user can be instructed to select another or alternate digital data file. For example, when the user selects an obscene (e.g., a pornographic image) image, the denial of access may be followed by a display of alternate images that are present in a catalog of authorized files.

The generated content is transferred to the mobile communication device 120 by sending a message to the mobile communication device 120. Message sent to the user can be performed by using various message systems such as short message service (SMS), multimedia message service (MMS), etc. Once a data connection is made with the mobile communication device 120 at 250, the operational parameters corresponding to the mobile communication device is determined at 260. For example, a data connection can be made once the user receives a notification of the sent message on the mobile communication device. Alternatively, data connection can be made once the user receives the message itself. Based on the determined operational parameters, the generated content is transcoded into a format compatible with the mobile communication device at 270. For example, a SMS message is a text only messaging technology that can include a pointer to information complementary to the generated content. This pointer, when activated (and/or when data associated with the pointer is sought) by the mobile communications device 120, causes one or more operational parameters associated with the mobile communications device to be determined so that data associated with the generated content may be transmitted (after transcoding the generated content into a format compatible with the mobile communication device) to the mobile communications device in a format compatible with the determined one or more operational parameters. Alternatively, the generated content is attached directly to a MMS message. The transcoded content is delivered to the user at 280. For example, when a SMS message is used, the link included in the SMS message allows the user to download the generated content, which has been transcoded to a proper format based on the determined operational parameters of the mobile device.

In some variations, the operational parameters might include: different transport technologies (CDMA, GMS, GPRS, EdVO, etc.), different mobile devices (Sony Ericsson, Samsung, Nokia, etc.), software execution platforms (Java, Brew, IDEN, MMS, etc.), and the like. The operational parameters may be determined, for example, by a header included in the communication from the mobile communication device 120 when the user activates the pointer. In some implementations, the operational parameters may be determined by having a server associated with the service being provided poll the mobile communications device to determine one or more of the parameters.

The operational parameters may also be determined based on, for example, the telephone number of the mobile communications device. In some variations, a user may access a website or complete an off-line registration process with a service provider in which one or more of the operational parameters are provided. Thereafter, when the user enters the telephone number of the mobile communication device into the digital file manager 110, a database associated with a plurality of users may be polled using the telephone number in order to determine a proper format to convey the data associated with the content to the mobile communications device. Alternatively, a user may also specify that in lieu of transmission to the mobile communications device, other delivery outlets for the data may be utilized such as an e-mail address or a postal address (which would entail sending brochure, CD, video, and the like to the user).

In some variations, the operational parameters are determined using other mechanisms, such as those described in a U.S. Patent Application No. 60/890,821 (entitled, "Automatic Provisioning of Abbreviated Dialing Codes.) For instance, when a user initiates a telephone call form a mobile communication device, a telephone signal is received by a wireless service provider and the received signal is processed using signal system #7 (SS7), a set of telephony signaling protocols. SS7 provides a universal structure for telephone network signaling, messaging, interfacing, etc. SS7 is used to establish a call, exchange user information, call routing, different billing structure, and supports Intelligent Network (IN) services. SS7 can also be used to identify operation parameters associated with the mobile device and/or the user.

Figure 3:
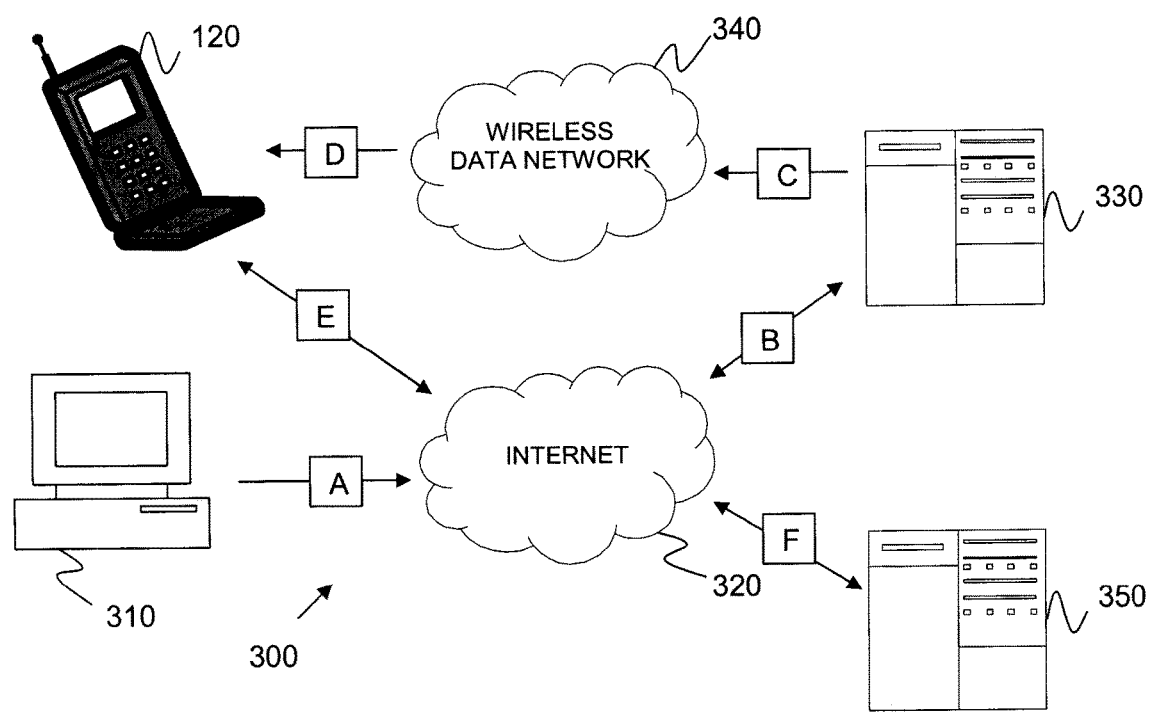
FIG. 3 is a schematic diagram illustrating a transfer of a digital data file to a mobile communications device.

FIG. 3 illustrates a schematic diagram 300 of data communications between the digital file manager 110 executing on a personal computer 310 and the mobile communication device 120. For example, a user operating the personal computer 310 invokes the digital file manager 110, either as a stand alone software or as an embedded software module (e.g., an embedded Active X component). A desired digital file is selected and edited using the digital file editor 112 to generate a desired digital content. The generated content is transferred to a first server 330 over the internet 320 (A-B). The First server 330 is operable to send a message to the mobile communications device 120 containing a pointer to data associated with the content via a wireless data network 340 (C-D). The message may be sent using text messaging such as short message service (SMS), multi-media message service (MMS) or other suitable data transfer mechanisms (A-B).

After receiving this message, the mobile communications device 120 may be operable to seek or otherwise request the data identified by the pointer via the Internet 320 (E-B). (or other data communications network) from a second server 350 (E-F). The second server 350 may then be operable to determine one or more operational parameters associated with the mobile communications device 120 once a data connection is made. Once the operational parameters are determined, the second server 350 can provide, or cause to be provided (e.g., by another server), the data identified in the pointer to the mobile communications device 120 in a format (i.e., after being transcoded to a proper format) compatible with the one or more determined operational parameters.

Figure 4A:
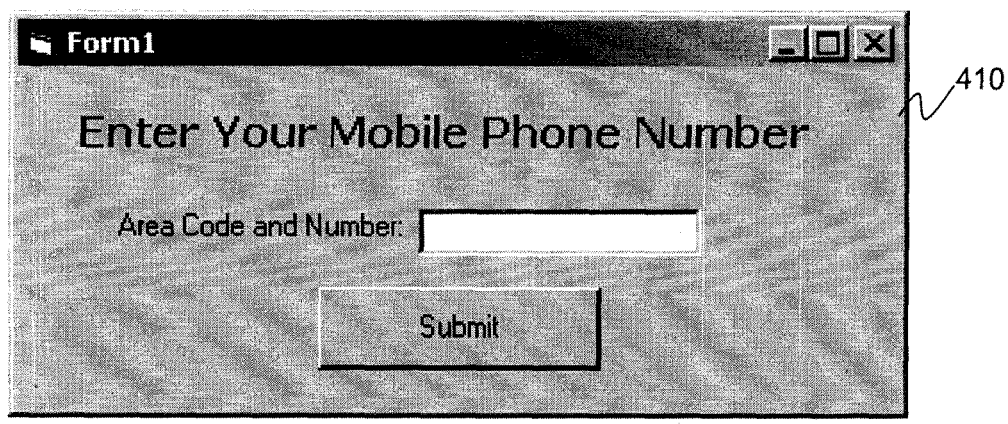
FIGS. 4A, 4B, 4C, 4D and 4E are illustrative representations of a graphical user interface for transferring a digital audio file to a mobile communication device.

FIGS. 4A-E illustrates a process for transferring an audio file to a mobile communications device 120 using a digital file manager 110 implemented as a stand alone software. A user invokes the digital file manager 110 to execute on a person computer. At a user interface 410, the user may enter a telephone number of the mobile communication device as shown in FIG. 4A. As described above, the telephone number may be used to identify the wireless network carrier associated with the telephone number.

Figure 4B:
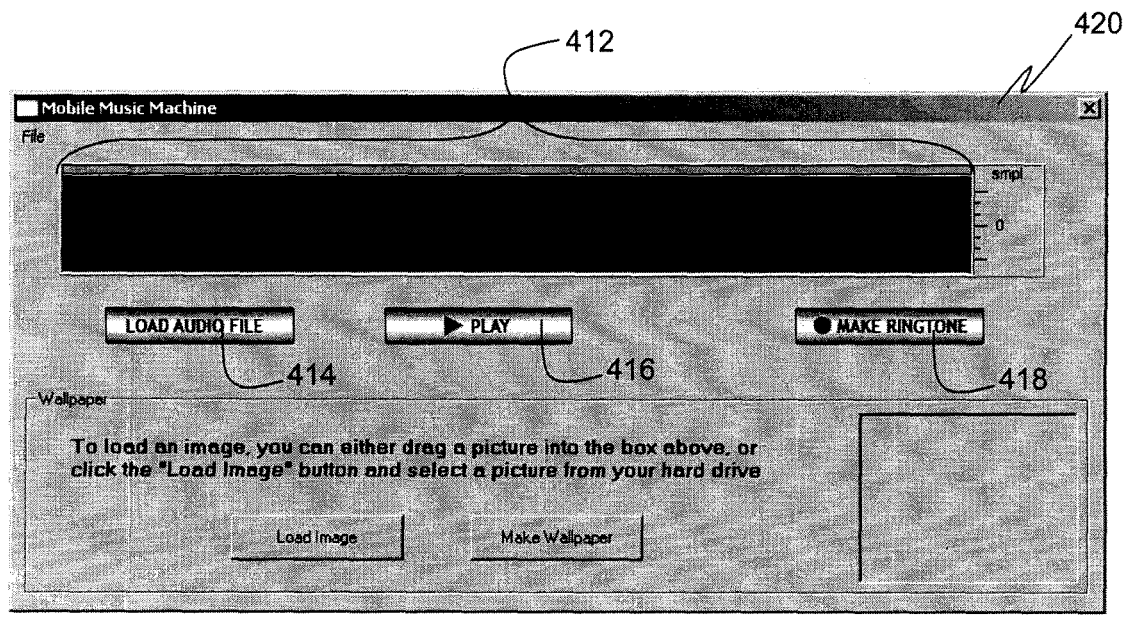

A user interface 420 as shown in FIG. 4B represents one implementation of the digital file editor 112. The user interface 420 may include an audio file display area 412, an audio file load button 414, an audio file play button 416, and a make ringtone button 418.

Figure 4C:
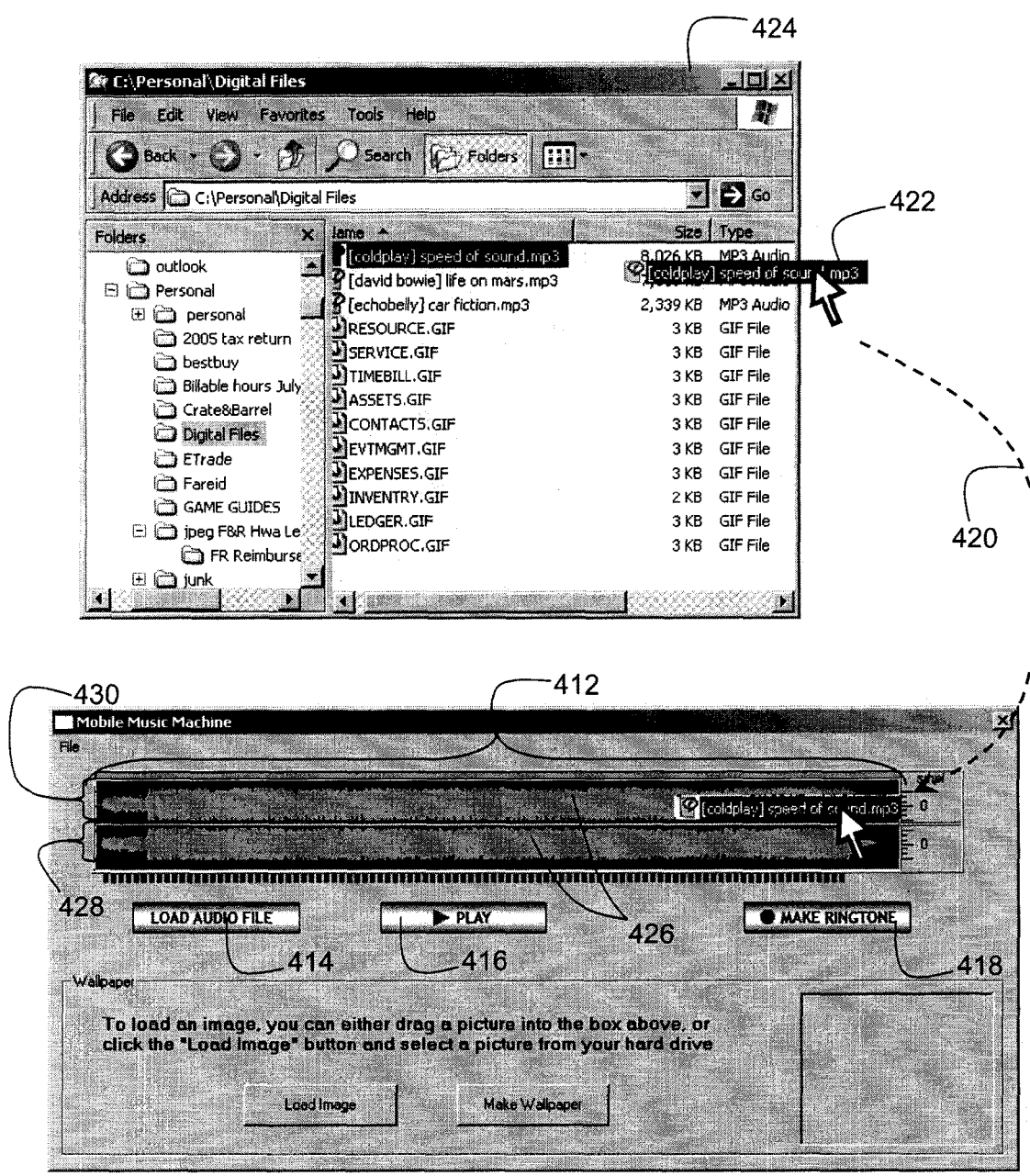

As shown in FIG. 4C, the user selects and loads a desired digital file (in this example, an MP3 audio file) in one of two ways. The user may drag and drop 420 an MP3 file 422 from the source location 424 onto the audio file display area 412. Alternatively, the user may interact with the load audio file button 414 to select an load an audio file. Once an audio file (e.g., an MP3 file) has been selected and loaded, for example via drag and drop 420, a visual indication 426 of the MP3 file being loaded onto the digital file editor 112 is provided in the audio file display area 412. The visual indication 426 comprises a left channel 428 and a right channel 430 visual indicators to differentiate the left and right channels of a stereo audio data.

Figure 4D:
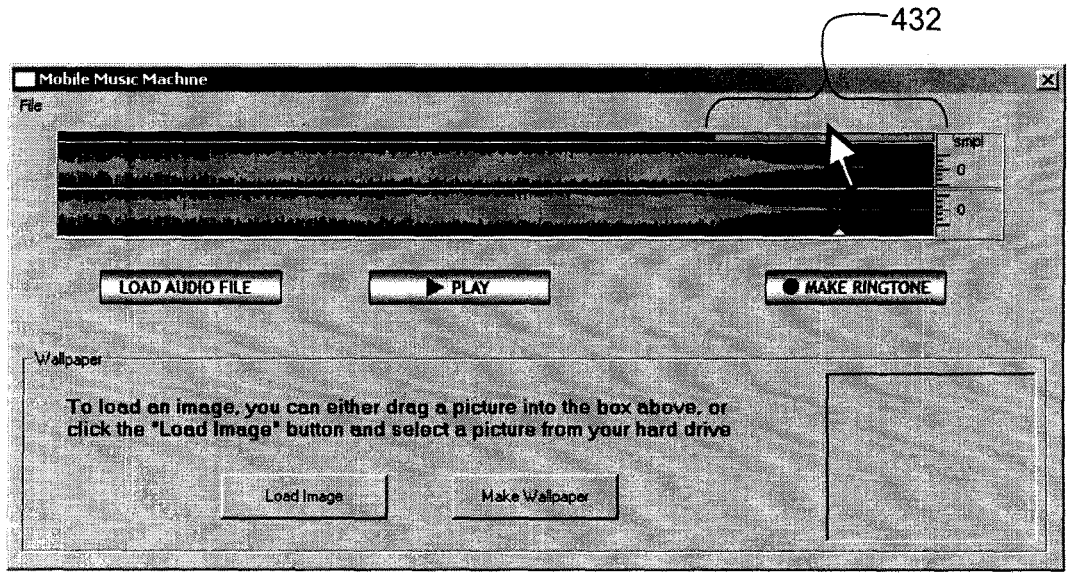
Figure 4D:
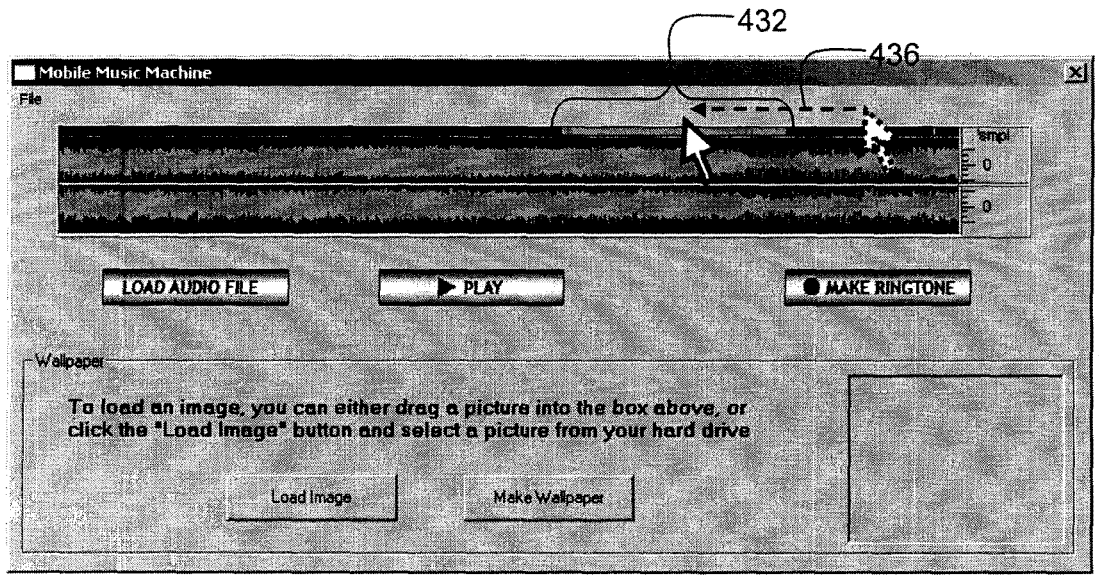

FIG. 4D illustrates a process of changing a time scale component for the MP3 file loaded. When the MP3 file is loaded initially, the visual indication 426 represents a compacted time scale to visualize all of the MP3 audio file data without needing to scroll across the audio file display area 412. The time scale can be expanded to show only a portion of the MP3 audio file on the audio file display area 412. A time scale indicator 432 shows that only a portion of the MP3 audio file is displayed. To scroll to a differ portion of the MP3 audio file, a user simply uses a mouse pointer to move 436 the time scale indicator 432 as shown on the bottom figure of FIG. 4D. The size of the time scale indicator 432 is inversely proportionate to the amount of the MP3 audio file indicated on the audio file display area 412 (i.e., smaller the size of the time scale indicator, more of the MP3 audio file is displayed).

Figure 4E:
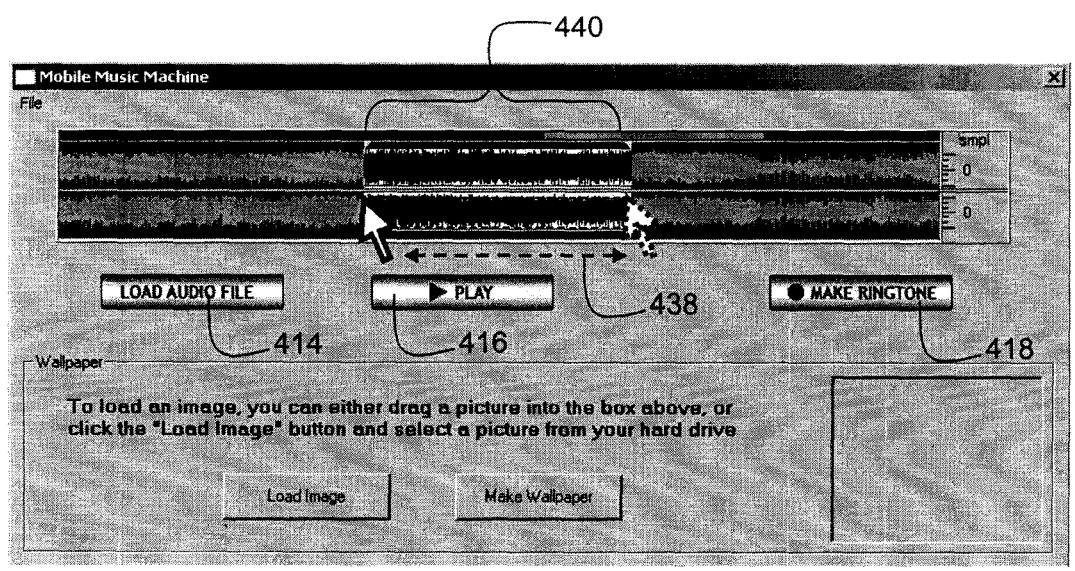

FIG. 4E illustrates a user select a desired portion of the MP3 audio file loaded on the digital file editor 112. A user uses a mouse pointer to highlight 438 the desired portion 440 of the MP3 audio file. The highlighted portion is the desire digital content to be transferred to the mobile communication device 1120. To verify that the desired portion has been selected, a user may interact (for example via a mouse click) with the audio file play button 416 to play the highlighted portion 440. A user selection of the make ringtone button 418 initiates a transfer of the highlighted portion 440, for example via SMS, to the mobile communication device 120 as described in FIGS. 1-3 above.

Figure 5:
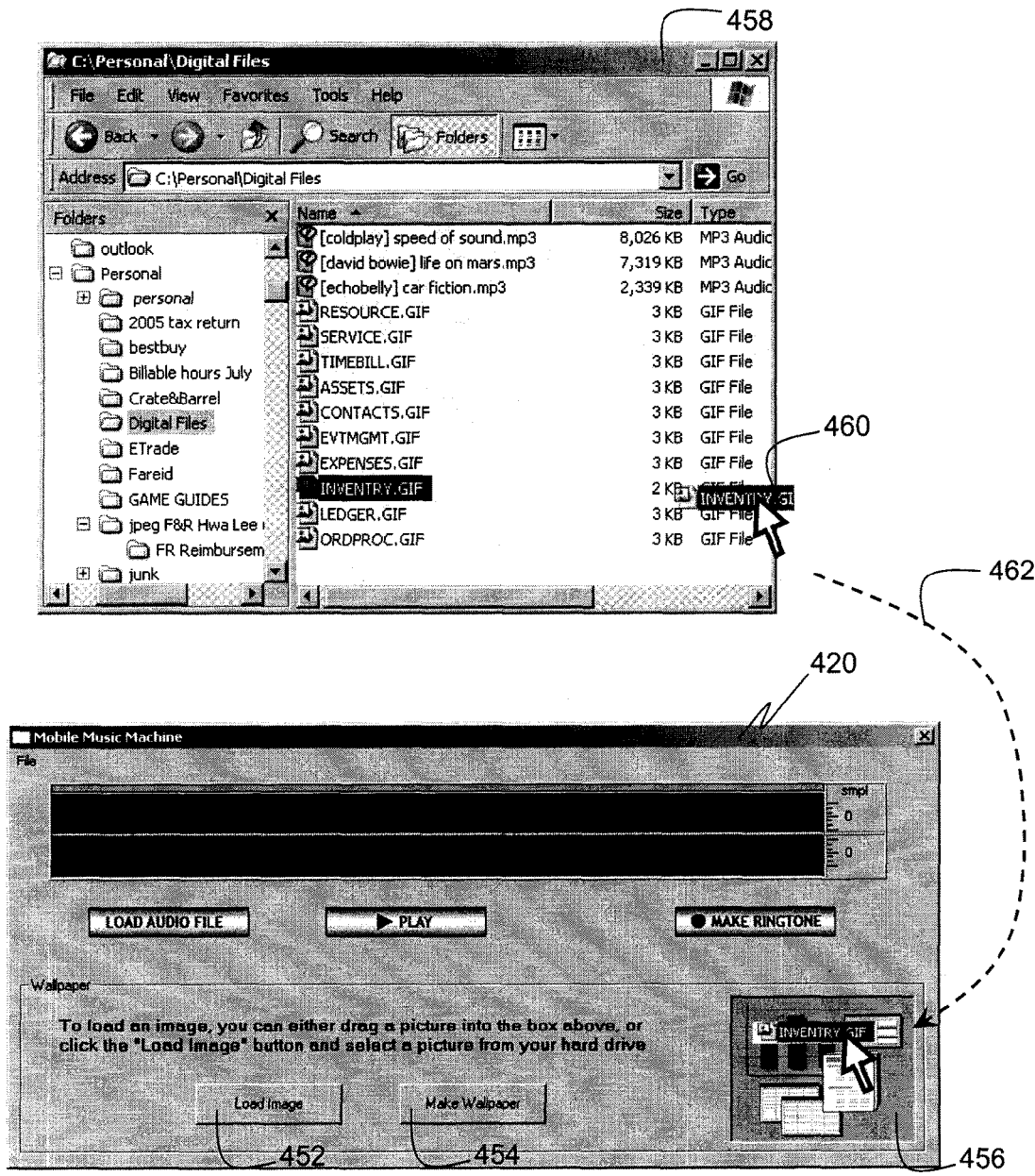
FIG. 5 is an illustrative representation of a graphical user interface for transferring a digital image file to a mobile communication device.

As shown in FIG. 5, the user interface 420 is further capable of allowing a user to selecting an image file 460 from a source 458 using drag and drop 462 and loading the image file 460. Alternatively, the user may select the desired image file 460 from the source 458 by using the load image button 452. When the user drag and drop an image file 460 onto an image display area 456, the selected image file 460 is automatically displayed for the user to preview.

Various image processing and editing is possible using the user interface 420. For example, the user may edit the selected image for color, size, brightness, contrast, etc. The image may also be rotated, cropped, and compressed. Other suitable image processing or editing functions are within the scope of the present disclosure.

Once the selected image 460 has been edited as desired by the user, the edited image file becomes the desire digital mobile content ready to be transferred to the mobile communication device 120. A user selection of the make wallpaper button 454 initiates a transfer of the desired digital content via a message system such as SMS, MMS, etc. as described in FIGS. 1-3 above.

The user interface 420 can further include capabilities to allow a user to select, load, edit, and transfer other data files including a video file (not shown). A desired video file can be selected and loaded using drag and drop or by interacting with a graphical user interface such as a button, a menu, or a tab. The loaded video file may be edited by the user as desired to create a desired video content. For example, a particular portion of the loaded video file can be selected similar to the process described for editing an audio file. In addition, other suitable video editing functions may be incorporated into the user interface 420, such as video compression.

In some implementations, the digital file manager 110 may be implemented as an embedded component such as an Active X DLL module in a web page. Digital files located on or linked to the web page can be transferred to the mobile communication device 120 by the processes described in FIGS. 1-3 above.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In particular, the determination of one or more parameters regarding the content may be determined during the initialization of the phone call. In addition, complementary information may be directly delivered to the mobile communications device in a compatible format (as opposed to a pointer). Other embodiments may be within the scope of the following claims.

A number of implementations of the disclosure has been described. Nevertheless, it will be understood that various modifications may be made without departing from the scope of the claims.

What is claimed is:

1. A method for providing mobile content to a mobile communication device, the method comprising:
   providing, by a first computing system including one or more servers via a communications network, a graphical user interface at a second computing system, the graphical user interface (i) enabling the user of the second computing system to edit a digital file to create the mobile content and (ii) prompting and enabling a user of the second computing system to provide a phone number associated with the mobile communication device, the mobile communication device being separate and remote from the first computing system and the second computing system;
   receiving, by the first computing system from the second computing system via the communications network, the mobile content and the phone number associated with the mobile communication device; and
   using, by the first computing system, the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

2. The method of claim 1, wherein the digital file comprises one of an audio file, a video file, and an image file.

3. The method of claim 1, further comprising:
   sending, by the first communication system to the mobile communication device via the wireless data network, a message including a link; and
   causing the delivery of the mobile content to the mobile communication device upon selection of the link by a user of the mobile communication device.

4. The method of claim 1, wherein the mobile content is delivered to the mobile communication device with an MMS message.

5. The method of claim 1, further comprising:
   identifying a user account associated with the phone number; and
   verifying a billing authorization for the identified user account.

6. The method of claim 1, further comprising verifying authorization to access the digital file using a digital rights management (DRM) technology.

7. The method of claim 1, wherein the graphical user interface is provided by one of a stand alone software and an embedded software module.

8. A system for providing mobile content to a mobile communication device, the system comprising a first computing system including one or more servers to:
   provide, via a communications network, a graphical user interface at a second computing system, the graphical user interface (i) enabling the user of the second computing system to edit a digital file to create the mobile content and (ii) prompting and enabling a user of the second computing system to provide a phone number associated with the mobile communication device, the mobile communication device being separate and remote from the first computing system and the second computing system;
   receive, from the second computing system via the communications network, the mobile content and the phone number associated with the mobile communication device; and
   use the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

9. The system of claim 8, wherein the digital file comprises one of an audio file, a video file, and an image file.

10. The system of claim 8, wherein the first communication system further:
    sends to the mobile communication device via the wireless data network, a message including a link; and
    causes the delivery of the mobile content to the mobile communication device upon selection of the link by a user of the mobile communication device.

11. The system of claim 8, wherein the mobile content is delivered to the mobile communication device with an MMS message.

12. The system of claim 8, wherein the first communication system further:
    identifies a user account associated with the phone number; and
    verifies a billing authorization for the identified user account.

13. The system of claim 8, further comprising verifying authorization to access the digital file using a digital rights management (DRM) technology.

14. The system of claim 8, wherein the graphical user interface is provided by one of a stand alone software and an embedded software module.

15. A computer program product embodied on a non-transitory computer-readable storage medium and executable by a first computing system, to perform operations comprising:
    providing, by the first computing system via a communications network, a graphical user interface at a second computing system, the graphical user interface (i) enabling the user of the second computing system to edit a digital file to create mobile content and (ii) prompting and enabling a user of the second computing system to provide a phone number associated with a mobile communication device, the mobile communication device being separate and remote from the first computing system and the second computing system;
    receiving, by the first computing system from the second computing system via the communications network, the mobile content and the phone number associated with the mobile communication device; and
    using, by the first computing system, the phone number received from the second computing system to cause the delivery of the mobile content to the mobile communication device via a wireless data network in a format compatible with one or more operational parameters of the mobile communication device, the one or more operational parameters including at least one of a mobile communication device type and a software platform type, wherein the using of the received phone number to cause the delivery of the mobile content to the mobile communication device is performed without the mobile communication device identifying the one or more operational parameters to the first computing system or the second computing system.

16. The computer program product of claim 15, wherein the operations further comprise:

sending, by the first communication system to the mobile communication device via the wireless data network, a message including a link; and causing the delivery of the mobile content to the mobile communication device upon selection of the link by a user of the mobile communication device.

17. The computer program product of claim 15, wherein the mobile content is delivered to the mobile communication device with an MMS message.

18. The computer program product of claim 15, wherein the operations further comprise:

identifying a user account associated with the phone number; and verifying a billing authorization for the identified user account.

19. The computer program product of claim 15, wherein the operations further comprise verifying authorization to access the digital file using a digital rights management (DRM) technology.

20. The computer program product of claim 15, wherein the graphical user interface is provided by one of a stand alone software and an embedded software module.

\* \* \* \* \*